May 13, 1969 A. D. WEDEKIND 3,444,506

CONNECTOR

Filed June 5, 1967

INVENTOR.

ALBERT D. WEDEKIND

BY

Carpenter, Kinney & Coulter

ATTORNEYS

United States Patent Office 3,444,506

Patented May 13, 1969

3,444,506

CONNECTOR

Albert D. Wedekind, West St. Paul, Minn., assignor to Minnesota Mining and Manufacturing Company, St. Paul, Minn., a corporation of Delaware Filed June 5, 1967, Ser. No. 643,714

Int. Cl. H01r 11/20

U.S. Cl. 339—99 9 Claims

ABSTRACT OF THE DISCLOSURE

Multi-connector having perforate flat base and matching top contains solderless wire-connector contact elements having extended tabs for making direct connection between perforated printed circuit board and flat cable held between base and top.

BACKGROUND OF THE INVENTION

This invention relates to electrical connectors for making electrical contact to conductors of multi-wire flat cables, and particularly for making contact between such conductors and components of printed circuits.

Insulating boards carrying printed circuits may be perforated at various points to receive the leads of various additional circuit elements, e.g. as illustrated in FIGURE 6 of U.S. Patent No. 2,734,150. The several leads are joined to their respective circuits by soldering, usually by briefly placing the surface of the assembled circuit board unit in contact with the surface of a pool of molten solder. The individual leads must first be independently inserted in the appropriate perforations of the board.

Flat multi-wire cable serves as a convenient means for making connection with large numbers of circuits or circuit components or elements. For many purposes it is desirable to make connection between wires of such cables and circuit elements of printed circuit boards (PC boards). Connection with the wires of flat cables may be conveniently and quickly made using connectors as described in U.S. Patent No. 3,189,863. Connection between the contact elements of said connectors and the circuitry of a PC board, prior to the present invention, has been accomplished primarily by means of intervening wire leads.

SUMMARY OF THE INVENTION

The present invention provides a simple, easily attached multi-connector which fits directly on the surface of a PC board and includes solderless spring wire-contacting connector elements which themselves provide direct contact with the PC board circuitry. As a result, assembly of circuits on a production scale is simplified, assembly errors are reduced or eliminated, space is conserved, disassembly and re-assembly or replacement operations are facilitated.

DESCRIPTION OF PREFERRED EMBODIMENT

Figures 1, 2, 3, 4, 5, 6:
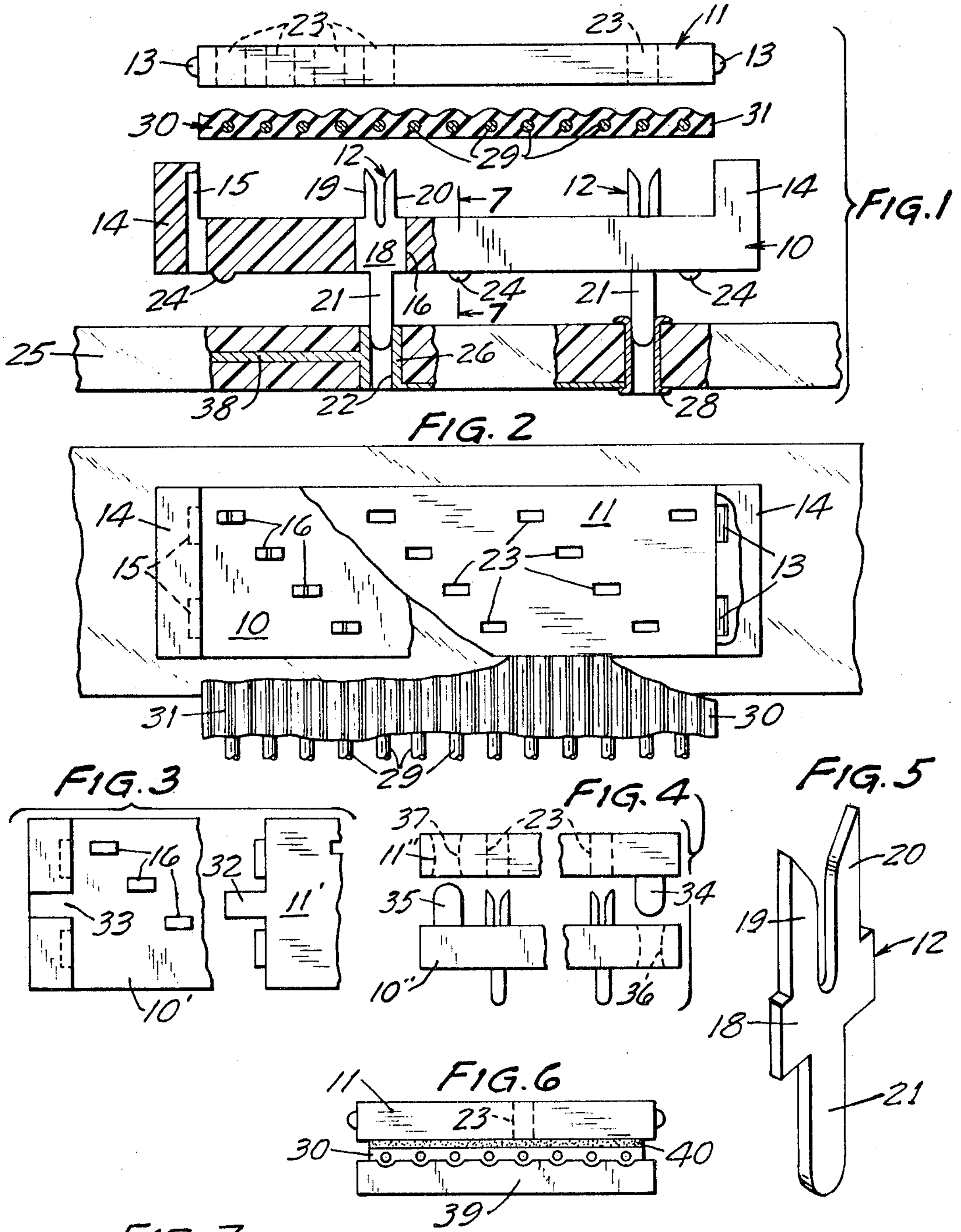
FIGURE 1 is an exploded partial view in elevation, and FIGURE 2 a partial top plan view, partly cut away to show detail, of one form of connector together with sections of flat cable and PC board in position for assembly.
FIGURE 3 is a partial plan view, and FIGURE 4 a partial elevation, of alternative connector body and top constructions.
FIGURE 5 is a view in perspective, and on an enlarged scale, of a contact element.
FIGURE 6 is a partial view in section showing an alternative cable mount.
Figure 7:
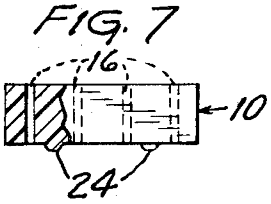
FIGURE 7 is a sectional elevation taken at line 7—7 of FIGURE 1 of a portion of the body member 10 of the connector of FIGURES 1 and 2.

The connector of FIGURES 1 and 2 consists of insulative body or base member 10 and cap or top member 11, and a number of conductive contact elements 12 carried by the base 10.

The top 11 fits closely between upright extensions 14 at the ends of the base 10 and is provided with bosses 13 which fit within corresponding depressions 15 in the inner faces of said extensions. The material of which the base 10 is formed is sufficiently resilient to permit insertion of the top, the bosses 13 being engaged within the depressions 15 to hold the top tightly in place. Polycarbonate, nylon, polysulfone, and similar polymeric insulator materials are highly suitable for the purpose.

The base 10 is provided with a series of rows of uniformly staggered perforations 16 into any or all of which may be inserted contact elements 12, as will be apparent from FIGURES 1 and 2. The element fits tightly within the perforation, i.e. with its edges forced against opposing walls thereof, so that considerable force must be exerted in inserting it, but is retained only by friction at its narrow edges so that it may subsequently be removed if desired. Thus the connector may be provided by the manufacturer with contact elements inserted in all of the perforations 16, and any undesired contact members may then be removed by the purchaser before use. Alternatively, the elements may be furnished separately and inserted in the base 10 in the required positions by the user.

The perforations may be in the form of long narrow slots as illustrated, or alternatively may be made somewhat wider along the central portion.

The contact element 12 of FIGURE 5 consists of a thin flat metal segment, desirably of spring brass or the like, having a widened rectangular central portion 18 the narrow edges of which fit tightly within the slot 16 as more particularly shown in FIGURE 1, a bifurcate upper portion consisting of pointed prongs 19, 20, and a centrally extended narrow lower pin 21. The adjacent edges of the prongs 19, 20 are parallel to each other over a major part of their length and then diverge to provide a wire-receiving opening. The narrow pin 21 fits within perforations 22 in a PC board 25 (FIGURE 1) and is of sufficient length to pass through the board and extend slightly past the opposite surface.

The top 11 is provided with perforations 23 in line with the perforations 16 of the base and extending up into the top a distance at least equal to the length of the prongs 19, 20 or preferably through the thickness of the top as shown. These perforations are slightly wider and thicker than the upper portion of the contact element, so that the prongs do not bind but are permitted to separate slightly when a wire is forced between them, e.g. by pressure applied with the top 11. Increased width of the perforations along at least the central portion permits easier entry of the prongs 19, 20.

Spacers 24, in the form of rounded dots as illustrated or of narrow elongate ribs, extend at intervals from the bottom surface of the base 10 to provide a free space between the connector and the adjacent surface of a PC board 25, thereby facilitating the removal with solvents of soldering flux retained at the PC board surface.

Apertures 22 in the PC board may be drilled or punched directly in the insulating board, but preferably are wholly or partly lined with a metallic coating 26 or hollow rivet or grommet 28, as shown in FIGURE 1, forming a part of the circuitry. In either case, when the base is in contact with the PC board, the tips of the pins 21 extend slightly beyond the lower surface of the board and may be soldered to the metallic lining by contacting the lower surface of the board with molten solder. The PC board may contain an inner conductive ground plane 38, and contact between such plane and an element 12 is made via the metallic lining 26 or 28.

In one procedure for using these connectors, e.g. to provide contact between some or all of the wires 29 of a flat cable 30 and appropriate circuit elements of a PC board, contact elements 12 are first inserted in appropriate slots 16 in the base 10, and the latter is placed on the PC board, previously provided with correspondingly located perforations. The tips of the elements are then soldered to the metallic linings of their respective perforations. The cable 30 is laid over the base and between the uprights 14, and the top 11 is then accurately positioned over the cable and is forced down until the bosses 13 snap within the depressions 15 and the upper surface of the top is flush with the upper edges of the uprights. The prongs of each contact element penetrate and displace the plastic insulation 31 of the cable and are forced apart by the corresponding wire 29, thereby making permanent positive electrical connection thereto. The cable is tightly compressed and held between the lower surface of the cap 11 and the upper surface of the base 10. Permanent electrical contact, between the wire conductors 29 and the metallic circuit components of the PC board, is established; and strong mechanical anchoring to the board is likewise obtained.

A preferred procedure involves first accurately and adherently positioning the top member 11 on the cable and then forcing the assembly onto the contact elements in the base 10. As indicated in FIGURE 6, the cable 30 is first supported on a closely fitting fixture 39 having a grooved surface corresponding to the ridged surface of the cable. A layer of pressure-sensitive adhesive 40 is affixed over the lower flat face of the top 11, preferably by transfer from a flexible temporary carrier sheet. The coated surface of the top member is then pressed onto the cable surface and with its perforations 23 in line with the conductors of the cable, being guided into proper position by suitable guides, not shown, forming a part of the fixture 39. The base 10, with contact elements inserted as desired, is applied to the PC board and soldered in place. The top, with the cable adherently bonded thereto, is then forced into position on the base to provide the completed connection.

Circuit paths may be provided on either or both surfaces of the PC board for connection with appropriate contact elements, and may additionally be present within the board as described hereinbefore in connection with the ground plane 38.

The top 11 may conveniently be accurately positioned over the base 10 by sensing its position with the fingertips at the four corners; or a self-aligning structure may be incorporated. One such structure, indicated in FIGURE 3, involves a central tenon 32 at each end of the top 11' fitting within a cooperating central mortise 33 in each of the uprights 14 of the base 10'. For convenience in assembly, the base may carry a slotted upright at one end and a tenon at the other, and the top may be similarly but oppositely provided with a tenon at the one end and a slotted upright at the other. In another equivalent variation, illustrated in FIGURE 4, the two members 10'' and 11'' are provided with inter-acting posts 34, 35 serving as tenons and internally slightly constricted perforations 36, 37 serving as mortises, to provide both alignment and positive locking action. The two members may alternatively be sealed together and against the cable by means of externally applied adhesives or volatile solvents or by localized fusion of the thermoplastic material, or by other means.

The provision of suitable connector assembling jigs, fixtures or presses makes possible the elimination of guide means such as the peg-and-hole or mortise-and-tenon means of FIGURES 4 and 3. Particularly in such cases it becomes possible to provide identical structure in both base and top members, with attendant economy and simplicity in molding, storage and supply. As an illustrative example, the base and top members of a connector for use with a multiple-wire flat cable each consist of a flat strip of thermoplastic polymeric insulating material measuring 3⅜ x ⅜ x $^{5}/_{64}$ inch and having 64 identical element-receiving perforations uniformly staggered and in four rows of sixteen each.

What is claimed is as follows:

1. A connector for making direct connection between wires of a multiconductor flat cable and circuit paths of a perforate printed circuit board, comprising a multi-perforate flat base, a correspondingly multi-perforate flat top, and flat spring metal contact members each including an extended-width rectangular central portion fitting tightly within a perforation in said base, a bifurcate portion extending from an end of said central portion toward the position of said top and fitting easily within the corresponding perforation in said top and consisting of two pointed opposed prongs for piercing the insulation of said cable and for making permanent positive electrical contact with a wire conductor of said cable, and a narrow pin extending from the opposite end of said central portion for insertion into an appropriate perforation of said board for making electrical contact with a circuit path thereof

2. The connector of claim 1 including means for aligning said base and top.

3. The connector of claim 1 including means for retaining said base and top in alignment and in permanent firm contact with a cable segment lying therebetween.

4. The connecter of claim 1 wherein said base is provided with projecting spacer elements on its board-contacting perforate surface.

5. The connector of claim 3 including mortise and tenon alignment means.

6. The connector of claim 3 including peg and hole aligning and holding means.

7. In combination, a connector as defined in claim 1 having affixed between said base and said top a section of a multiconductor flat cable and with said base mounted on a perforate printed circuit board, said contact members providing electrical contact between wires of said cable and circuit paths of said board.

8. The combination of claim 7 wherein said top and said cable are adhered together by an intervening thin film of pressure-sensitive adhesive.

9. The connector of claim 1 wherein the surface of said flat top facing said base is provided with a thin layer of pressure-sensitive adhesive.

References Cited

UNITED STATES PATENTS

| | | | |
|---|---|---|---|
| 3,189,863 | 6/1965 | Leach | 339—99 |
| 3,201,744 | 8/1965 | Dean. | |
| 3,235,833 | 2/1966 | Elm. | |

MARVIN A. CHAMPION, *Primary Examiner.*

PATRICK A. CLIFFORD, *Assistant Examiner.*

U.S. Cl. X.R.

339—17